UNITED STATES PATENT OFFICE.

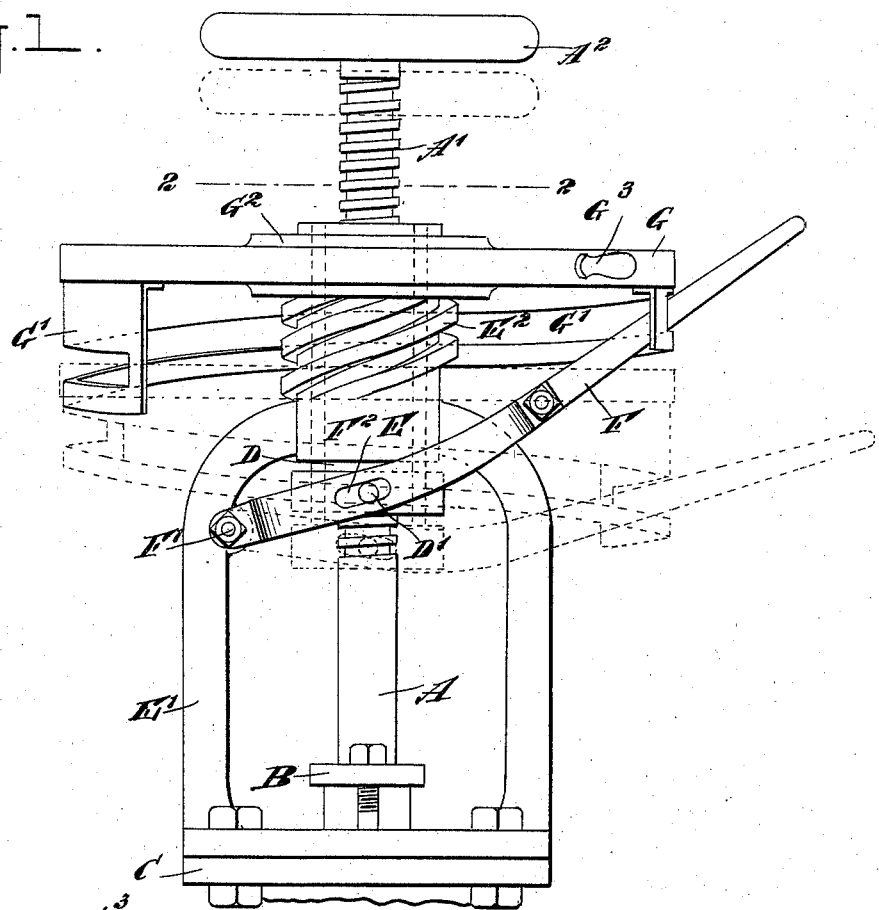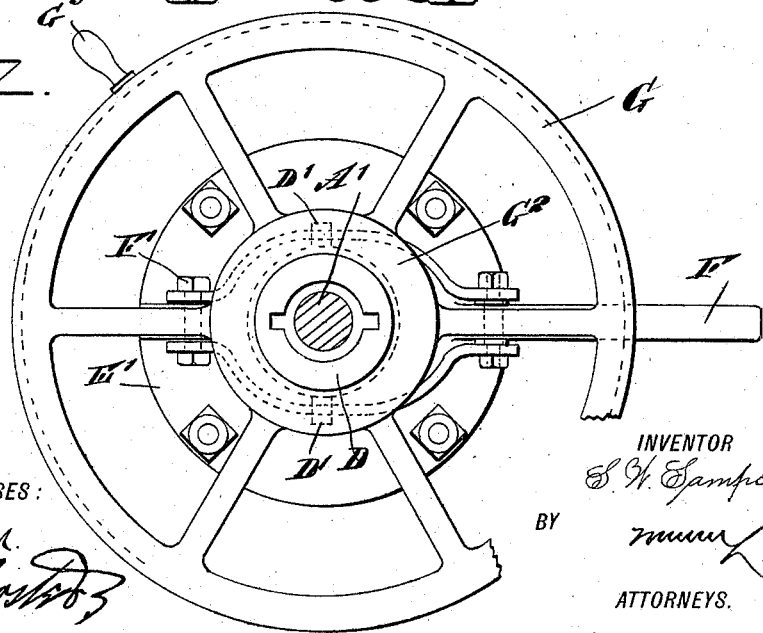

SIDNEY WINFIELD SAMPSON, OF HUDSON, MASSACHUSETTS.

VALVE.

SPECIFICATION forming part of Letters Patent No. 576,474, dated February 2, 1897.

Application filed October 19, 1896. Serial No. 609,372. (No model.)

*To all whom it may concern:*

Be it known that I, SIDNEY WINFIELD SAMPSON, of Hudson, in the county of Middlesex and State of Massachusetts, have invented a new and Improved Valve, of which the following is a full, clear, and exact description.

The invention relates to valves such as shown and described in Letters Patent of the United States, No. 570,772, granted to me on November 3, 1896.

The object of the present invention is to provide certain new and useful improvements in valves whereby the valve can be conveniently and quickly moved toward or from the valve-seat.

The invention consists principally of a cam-wheel arranged for movement in the direction of the axis of the valve-stem and a lever controlled by the cam-wheel and connected with the nut of the valve-stem.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1 is a side elevation of the improvement, and Fig. 2 is a sectional plan view of the same on the line 2 2 of Fig. 1.

The valve-stem A, carrying the valve, extends through the stuffing-box B of the valve-casing C, and the threaded portion A' of the said valve-stem screws in a nut D, fitted to slide in a bearing E, held on a yoke E', attached to the casing C. The nut D is engaged by a lever F, fulcrumed at F' on the yoke E', the said lever serving to move the nut D in its bearing E in the direction of the axis of the valve-stem, so as to move the latter bodily in the direction of its axis, so as to move the valve toward or from its valve-seat. The connection between the lever F and the nut D is by lateral pins D', secured on the nut D and extending into elongated slots $F^2$ formed on the lever F.

The free end of the lever F is engaged by the cam-groove G' of a cam-wheel G, formed in its hub with a nut $G^2$, screwing on the screw-threads $E^2$, formed externally on the bearing E. Thus when the cam-wheel G is turned it screws on the threads $E^2$ and consequently moves in the direction of the axis of the stem A, and the cam-wheel by its cam-groove imparts a swinging motion to the lever F, so that the latter shifts the nut D in the bearing E to move the valve toward or from its valve-seat.

The cam-wheel G is provided at its periphery with suitable handles $G^3$, adapted to be taken hold of by the operator to conveniently and quickly turn the said cam-wheel and shift the valve rapidly toward and from its valve-seat whenever desired.

It is understood that the stem A can be turned in the usual manner by the operator manipulating the hand-wheel $A^2$ on the said valve-stem to screw the latter in its nut D, so as to adjust the valve relative to its seat; but when it is desired to quickly open or close the valve then the operator makes use of the cam-wheel G, as above described.

Having thus fully described my invention, I claim as new and desire to secure by Letters Patent—

1. A valve, provided with a cam-wheel arranged for movement in the direction of the axis of the valve-stem, and a lever controlled by the said cam, and connected with the nut of the valve-stem, substantially as shown and described.

2. The combination with a valve-stem having a threaded portion, of a nut in which screws the said threaded portion of the valve-stem, a lever for shifting the said nut and stem, and a cam-wheel engaging the said lever and arranged to turn and to move in the direction of the axis of the said valve-stem, substantially as shown and described.

3. The combination with a fixed bearing, of a nut fitted to slide in the said bearing, and adapted to engage the threaded portion of the valve-stem, a cam-wheel screwing on the said bearing, and a lever connected with the said nut and engaged by the said cam-wheel, substantially as shown and described.

SIDNEY WINFIELD SAMPSON.

Witnesses:
RALPH E. JOSLIN,
MAY WARREN.